United States Patent
Moore et al.

(10) Patent No.: US 12,155,792 B2
(45) Date of Patent: *Nov. 26, 2024

(54) INTELLIGENT ATTESTATION OF TRAFFIC USING A ROUTING ENGINE

(71) Applicant: Level 3 Communications, LLC, Denver, CO (US)

(72) Inventors: Richard D. Moore, Frederick, CO (US); Joseph Roy, Swartz Creek, MI (US); Joseph Scivicque, Lafayette, LA (US); Matthew C. Hess, Broomfield, CO (US); George Wendell McFalls, Colorado Springs, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,703

(22) Filed: Apr. 2, 2024

(65) Prior Publication Data

US 2024/0251036 A1 Jul. 25, 2024

Related U.S. Application Data

(63) Continuation of application No. 18/134,766, filed on Apr. 14, 2023, now Pat. No. 11,956,384, which is a continuation of application No. 17/946,467, filed on Sep. 16, 2022, now Pat. No. 11,632,461, which is a continuation of application No. 17/239,154, filed on Apr. 23, 2021, now Pat. No. 11,451,663.

(60) Provisional application No. 63/140,152, filed on Jan. 21, 2021, provisional application No. 63/015,193, filed on Apr. 24, 2020.

(51) Int. Cl.
| | | |
|---|---|---|
| *H04M 3/436* | (2006.01) | |
| *H04L 9/40* | (2022.01) | |
| *H04M 3/42* | (2006.01) | |

(52) U.S. Cl.
CPC ........ *H04M 3/436* (2013.01); *H04L 63/1466* (2013.01); *H04M 3/42042* (2013.01)

(58) Field of Classification Search
None
See application file for complete search history.

(56) References Cited

U.S. PATENT DOCUMENTS

| | | | |
|---|---|---|---|
| 10,951,775 | B1 | 3/2021 | Okhrimenko |
| 11,451,663 | B2 | 9/2022 | Moore |
| 11,632,461 | B2 | 4/2023 | Moore |
| 11,956,384 | B2 * | 4/2024 | Moore ............. H04M 3/42042 |
| 2020/0153959 | A1 | 5/2020 | Scivicque |
| 2020/0252503 | A1 | 8/2020 | Li |
| 2020/0336314 | A1 | 10/2020 | Barakat |
| 2021/0297529 | A1 | 9/2021 | Weiser |
| 2021/0337067 | A1 | 10/2021 | Moore |
| 2021/0377389 | A1 | 12/2021 | Combellas |

(Continued)

*Primary Examiner* — Harry S Hong

(57) ABSTRACT

The present application describes providing an attestation level to a received communication. The attestation level may be used to communicate a level of security to a network or a called party that receives the communication. The attestation level associated with the communication may indicate to a destination network and/or recipient that the phone number associated with the communication is secure and/or the telephone number has not been spoofed.

7 Claims, 7 Drawing Sheets

(56) References Cited

U.S. PATENT DOCUMENTS

2023/0016508 A1   1/2023   Moore
2023/0254406 A1   8/2023   Moore

\* cited by examiner

INTELLIGENT ATTESTATION OF TRAFFIC USING A ROUTING ENGINE

BACKGROUND

A robocall is a phone call that typically delivers a recorded message. In many if not all cases, a robocall is delivered from an automated source. In some instances, a robocall alters or spoofs the calling number in an attempt to deceive the called party. For example, when the called party receives a robocall, the calling number may be spoofed in order to appear as if the called party is receiving a call from a legitimate business, a neighbor, etc.

SUMMARY

The present application describes a system and method for providing an attestation level to a received communication, such as, for example, a telephone call. The attestation level may be used to communicate a level of security to a network or a called party (or other recipient) that receives the communication. For example, an attestation level associated with a communication may indicate to a destination network and/or recipient that the phone number associated with the communication is secure or has not been spoofed.

Accordingly, the present application describes a method for providing an attestation level for a communication. In some examples, the method includes receiving a communication addressed to a destination network and determining, based at least in part on a property associated with the communication, whether the communication is associated with a particular originating domain. Based on determining that the communication is associated with the particular originating domain, an attestation level for which the communication is eligible is determined. A tag is associated with the communication. In some examples, the tag indicates the attestation level. The communication and the tag are provided to a routing engine and the routing engine determines, based at least in part on the tag, to route the communication to a signing server which provides an attestation at the attestation level. The communication with the attestation may then be routed to the destination network.

The present application also describes another method for providing an attestation level for a communication. In some examples, the method includes receiving a communication and determining, based at least in part on a property associated with the communication, whether the communication is associated with a particular originating domain. When it is determined that the communication is associated with the particular originating domain, associating a tag with the communication. In some examples, the tag indicates a particular attestation level for the communication. The method also includes determining, based at least in part on the tag, whether to route the communication to a signing server or to a routing engine. When the communication is routed to the signing server, the signing server provides an attestation of the communication at the particular attestation level.

Also described is a system for providing an attestation level to a received communication. In some examples, the system includes a first routing engine for associating a tag with a received communication comprising a property, the communication being associated with a particular originating domain and the tag indicating an attestation level for which the communication is eligible based on the property and the particular originating domain. The system may also include a second routing engine that modifies a routing of the communication based, at least in part on the tag. The system may also include a signing server that provides attestation at the attestation level for the communication.

The present application also describes a method for determining an attestation level for a communication based, at least in part, on a domain associated with the communication and a virtual trunk associated with the communication. The method begins when a communication is received. When the communication is received, a property associated with the communication is determined. The property indicates whether and/or which virtual trunk is to be associated with the communication. In an example, the virtual trunk is associated with information that indicates a particular attestation level for the communication. A tag is associated with the communication. In an example, the tag indicates the particular attestation level for the communication. An attestation level is then provided to the communication based on the tag.

The present application also describes a method of determining an attestation level for a communication based on a combination of a domain and virtual trunk associated with the communication. In an example, the method begins when a communication is received and a domain associated with the communication is determined. A virtual trunk associated with the communication is also determined. In an example, the virtual trunk is selected based, at least in part, on the domain. Another determination is made regarding the attestation level for the communication. The attestation level is based, at least in part, on information associated with the domain and on information associated with the virtual trunk. A tag is associated with the communication. The tag indicates the attestation level for the communication. An attestation level is then provided to the communication based on the tag.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
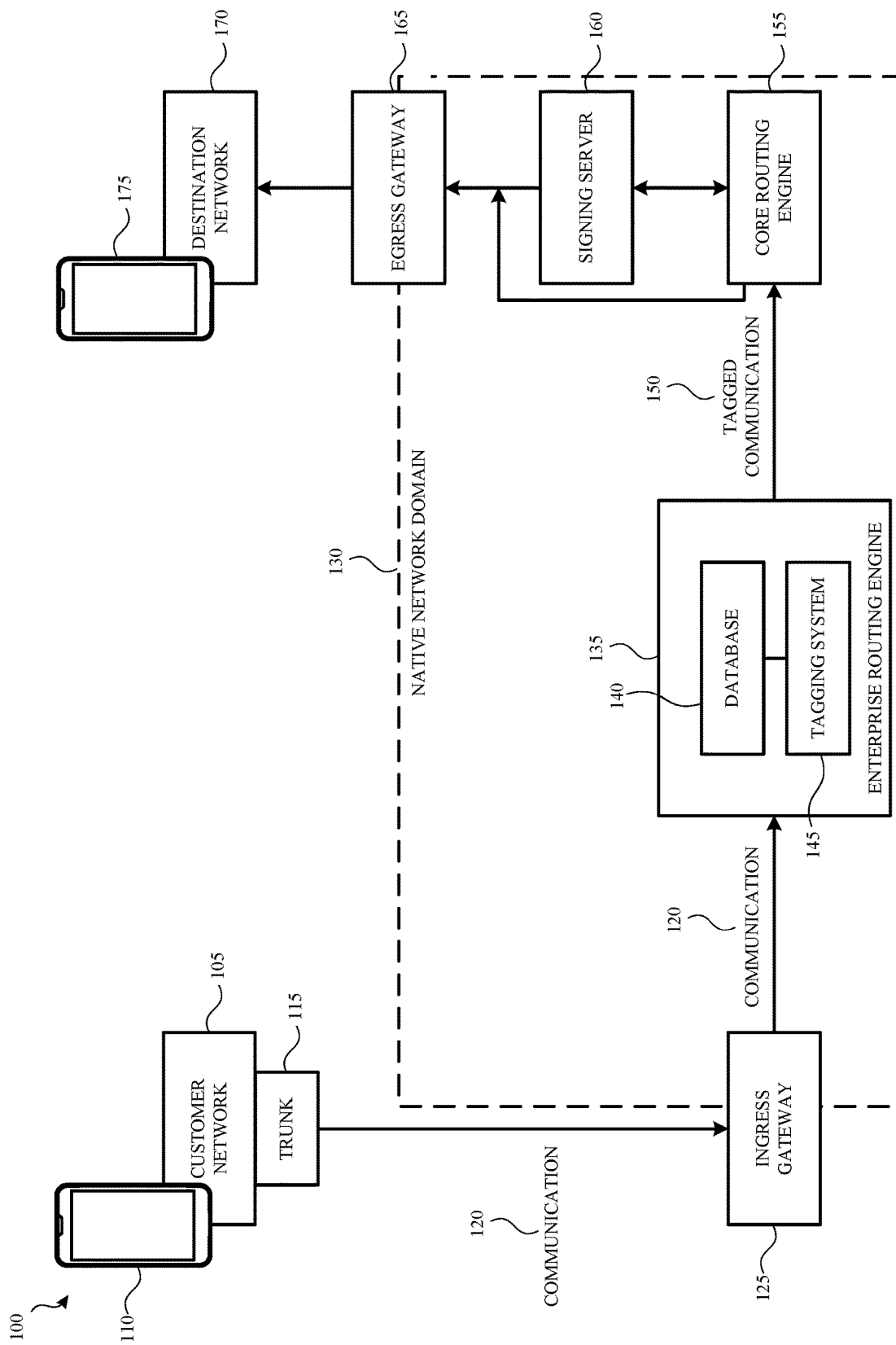
FIG. 1A illustrates an example system for providing an attestation level to a communication in accordance with a first example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Robocallers often spoof their calls to indicate to a receiver of the call (e.g., via a caller ID), that the call originates from a different source. For example, a robocall may spoof the phone number of a government agency in an attempt to get the call recipient to divulge confidential information such as a social security number, a credit card number, or a bank account number.

In an attempt to combat this, the STIR/SHAKEN protocol was developed. STIR, short for "Secure Telephony Identity Revisited," is used to verify the caller ID of received calls in a voice-over-IP (VOIP) system. For example, when a call is received in VOIP system, a service provider may examine the caller ID and compare it to a list of caller IDs provided by the service provider. If there is a match, an encrypted certificate is attached to the call. The encrypted certificate indicates an attestation level or trust value for the call. The encrypted certificate and the call are then provided to a destination such as, for example, a destination network and/or a called party.

SHAKEN, short for "Signature-based Handling of Asserted information using toKENs" is used for non-VOIP systems (e.g., cell phones, public switched telephone networks (PSTN), etc.). Like the STIR protocol, the SHAKEN protocol is primarily used to determine whether a caller ID of a cell phone or PSTN-based call has been spoofed.

The STIR/SHAKEN protocol provides for three different levels of verification or attestation—Full Attestation (Level A), Partial Attestation (Level B) and Gateway Attestation (Level C). In order to achieve Full Attestation, the service provider must be able to authenticate the calling party and verify that the calling party is authorized to use the calling number. In order to achieve Partial Attestation, the service provider must be able to authenticate the origin of the call but is not required to verify that the calling party is authorized to use the calling number. In order to achieve Gateway Attestation, the service provider must be able to authenticate from where the call was received even if the service provider cannot authenticate the source of the call.

Once the call and the attestation level are received by a destination network, the destination network can determine how the call should be handled. For example, if a call with a Level A attestation is received by a destination network, the destination network is able to determine that the caller ID of the received call is accurate. As such, the destination network may forward the call to the intended recipient. However, if the destination network receives a call with a Level C attestation, the destination network may determine whether to change the caller ID associated with the call (e.g., change the caller ID from a number or name to "Unknown") and/or forward the call to the intended recipient. Some destination networks may also automatically filter out any call with a Level C attestation or provide its customers with the opportunity to do so.

Providing an attestation level for every received call may require significant processing power. As such, it may be difficult and/or costly to implement the STIR/SHAKEN protocol. Additionally, it may be desirable for a communication service provider to implement this protocol for subset of its customers or for those customers who are eligible to achieve a particular attestation level rather than for all calls received by the communication service provider.

For example, when a call is received by a routing engine of the communication service provider, it may be desirable to know or otherwise determine which calls should be attested and at what level. As such, the present application describes a tagging process that can be used to identify which calls should be attested at various attestation levels. Thus, a routing engine may be able to easily identify which calls should be routed to a signing server to obtain an encrypted certificate that indicates the attestation level of the communication.

In the examples provided, the tagging and/or the subsequent attestation level may be based on different factors. These factors may include an area or market from which the call originates and/or a customer network from which the call originates. Thus, information about a domain associated with the call may be used to determine the attestation level of the call. In another example, information about a trunk associated with the call may be used to determine the attestation level of the call. In yet another example, information about a domain associated with a call in combination with information about a trunk associated with the call may be used to determine the attestation level of the call.

These and other examples will be explained in more detail below with respect to FIG. 1A-FIG. 5. It will be appreciated that the examples shown by the figures and described herein may be used across the various implementations (e.g., domain level attestation, trunk level attestation and domain and trunk level attestation) described herein.

FIG. 1A illustrates an example system 100 for providing an attestation level for a communication 120 according to an example. In some examples, the communication 120 is a telephone call. The communication 120 may be provided via a VOIP system. In other examples, the communication 120 may be provided via a cellular system or via a PSTN system.

In the example shown in FIG. 1A, the system 100 includes a calling device 110 associated with a customer network 105. The customer network 105 may be associated with an enterprise such as, for example, a university, a business, a corporation, a government entity and the like. In such examples, a communication service provider (e.g., a provider of a native network domain 130) provides communication services to the enterprise according to a service level agreement. As part of the agreement, the communication service provider may assign the enterprise a set of telephone numbers and/or an enterprise specific domain. Thus, each calling device 110 associated with the enterprise may be provided with a particular phone number and be associated with the enterprise specific domain.

As briefly mentioned above, the communication service provider may provide a native network domain 130 that routes received communications 120 from an origin to a destination. For example, the native network domain 130 may include an ingress gateway 125 for providing a communication service to various calling devices 110 of a customer network 105. The native network domain may also provide an egress gateway 165 for providing access to communication services provided by a destination network 170 and/or a destination device 175 associated with the destination network 170. Although a single ingress gateway 125 and a single egress gateway 165 are shown, the system 100 may include multiple ingress gateways and/or egress gateways.

In some examples, the ingress gateway 125 may be associated with or otherwise assigned to a trunk 115 and the trunk 115 may be assigned to the customer network 105. Thus, when the native network domain 130 receives a communication 120 from a calling device 110 of the customer network 105, the trunk 115 may provide information (e.g., identity information or properties such as a calling number, an enterprise specific domain, etc.) about the communication 120 to the ingress gateway 125. Because the ingress gateway 125 is associated with the customer network 105, the ingress gateway 125 may also "know" that any communication 120 received from the customer network 105 is to be attested. In some examples, the ingress gateway 125 may be associated with multiple customer networks and/or trunks. In such examples, the customer and/or the customer network may be identified by an IP address, an interface and/or other parameters associated with an incoming communication. Just like the example above, the ingress gateway 125 may use this information to determine which communications should be attested and may also determine the attestation level.

For example, a provider of the customer network 105 and/or native network domain 130 may desire that communications originating from its customer network 105 be attested at a particular attestation level (e.g., Level A). Thus, when the ingress gateway 125 receives a communication 120 from the customer network 105 and/or its associated trunk 115, the ingress gateway 125 may determine that the communication 120 is from customer network 105 and appropriately route the communication 120 such that it is attested at the particular attestation level.

For example, when the ingress gateway 125 receives the communication 120 from the trunk 115, the ingress gateway 125 is programmed to determine that this particular communication 120 should be attested (or undergo an attestation level determination process). As such, the ingress gateway 125 may provide the communication to an enterprise routing engine 135.

When the communication 120 is received by the enterprise routing engine 135, the enterprise routing engine 135 appends a tag to the communication 120 using a tagging system 145. The tag indicates a level of attestation for which the communication 120 is eligible. For example, when the communication 120 is received by the enterprise routing engine 135, the enterprise routing engine 135 may determine one or more properties associated with the communication 120. The one or more properties may include the domain associated with the communication 120, a phone number associated with the communication 120, a location from which the communication 120 originated, a trunk 115 associated with the communication 120 etc.

The enterprise routing engine 135 may compare the one or more properties associated with the communication 120 with information contained in a database 140. For example, the database 140 may include information as to whether the phone number, the trunk 115 and/or the domain is/are associated with a customer network 105 and/or enterprise that is eligible for a particular attestation level.

In some examples, a provider of the customer network 105 and/or the native network domain 130 may specify or otherwise indicate that calls originating from the customer network 105 and/or trunk 115 be provided a particular level of attestation. For example, the service provider may specify that communications from Company A and originating from its trunk 115 may be attested at Level A. Thus, when a communication 120 is received from Company A, the enterprise routing engine 135 compares one or more properties of the communication 120 (e.g., the domain, the trunk and/or the phone number) with information stored in the database 140 to determine whether the communication 120 should be attested at the requested attestation level.

If the enterprise routing engine 135 determines, based on the information contained in the database 140 and the information or other properties associated with the communication 120, that the communication 120 includes a phone number that the communication service provider assigned to the particular enterprise, the communication 120 is eligible for Level A attestation. As such, the tagging system 145 provides or otherwise appends a tag to the communication 120 to generate a tagged communication 150. The tag indicates that the tagged communication 150 is eligible for Level A attestation.

In another example, the enterprise routing engine 135 may determine, based on one or more properties associated with the communication and/or on information contained in the database 140, that the communication 120 originates from the customer network 105 but is not using an assigned phone number. As such, the tagging system may provide or otherwise append a tag to the communication 120 that the communication 120 is eligible for Level B attestation.

Likewise, if the enterprise routing engine 135 receives a communication 120 (either from the ingress gateway 125 or another ingress gateway) and is not able to determine (based on one or more properties associated with the communication 120 and/or information contained in the database 140) the enterprise or the subscriber number from which the communication 120 originated, the tagging system 145 may append a tag to the communication 120 that indicates the communication 120 is eligible for Level C attestation.

Once the communication 120 has been tagged by the enterprise routing engine 135 the tagged communication 150 is provided to a core routing engine 155. The core routing engine 155 may then determine, based at least in part on the tag, how to route the tagged communication 150.

For example, attesting each communication at each of the different attestation levels may consume a lot of processing power. As such, in some cases, it may be desirable to only attest tagged communications 150 that are eligible for Level A attestation. Thus, when the core routing engine 155 receives a tagged communication 150 having a tag that indicates the tagged communication 150 is eligible for Level A attestation, the core routing engine 155 provides the tagged communication 150 to a signing server 160. In examples, this requires the core routing engine 155 to override its typical routing protocol, based on the presence of the tag, to route the message to the signing server 160 rather than through egress server 165 to destination network 170.

The signing server 160 generates an encrypted certificate that indicates the tagged communication 150 has been attested at Level A. In some examples, the signing server 160 may then provide the tagged communication 150 and the encrypted certificate back to the core routing engine 155. The core routing engine 155 subsequently provides the tagged communication 150 and the encrypted certificate to the egress gateway 165. In yet another example, the core routing engine 155 queries the signing server 160 for an encrypted certificate and subsequently passes the encrypted certificate and the tagged communication 150 to the egress gateway 165. In another example, the signing server 160 may provide the tagged communication 150 and its associated certificate to the egress gateway 165 without providing the tagged communication 150 and the certificate back to the core routing engine 155.

Continuing with the example above, if the core routing engine 155 receives a tagged communication 150 having a tag that indicates the tagged communication 150 is eligible for Level B attestation or Level C attestation, the core routing engine 155 may route the tagged communication 150 directly to the egress gateway 165. Thus, in examples, the tagged communication 150 will not receive an attestation level from signing server 160 and processing resources are saved.

In another example, the native network domain 130 may determine or otherwise have instructions to attest tagged communications that are eligible for Level A or Level B attestation. As such, when the core routing engine 155 receives a tagged communication 150 having a tag that indicates the tagged communication 150 is eligible for Level A attestation or Level B attestation, the core routing engine 155 provides the tagged communication 150 to the signing server 160 such as described above. However, tagged communications 150 having a tag that indicates the tagged communication 150 is eligible for Level C attestation may be provided directly to the egress gateway 165.

Once the tagged communication 150 (and any associated encrypted certificate) is provided to the egress gateway 165, the egress gateway 165 may provide the tagged communication to a destination network 170 and the destination device 175.

Thus, using the system 100, a communication service provider may be able to implement the STIR/SHAKEN protocol in phases by selectively determining which traffic to attest and at which levels. For example and as described above, the native network domain may attest only communications that are eligible for Level A attestation. In another example, the native network domain may attest only communications that originate from a particular enterprise—regardless of whether the communications are eligible to be attested at Level A or Level B or Level C.

Figure 1B:
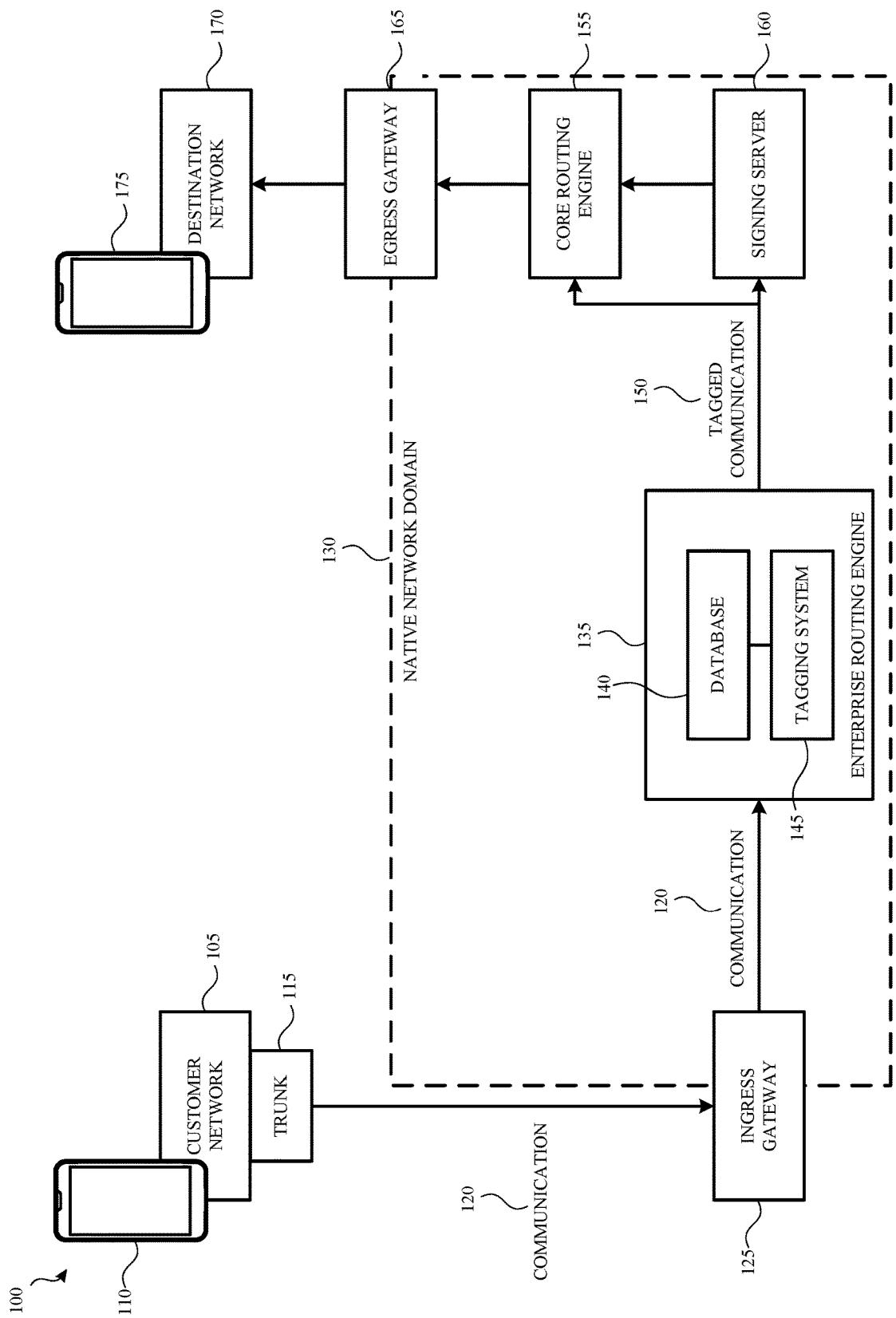
FIG. 1B illustrates an example system for providing an attestation level to a communication in accordance with a second example.

FIG. 1B illustrates the example system 100 of FIG. 1A in accordance with a second example. In the example shown in FIG. 1B, the enterprise routing engine 135 is configured to send certain of the tagged communications 150 directly to the signing server 160. Once the signing server 160 has attested the tagged communication 150 with the appropriate attestation level (e.g., based on the tag), the signing server 160 may provide the tagged communication 150 and the encrypted certificate to the core routing engine 155. The tagged communication and encrypted certificate is then provided to the egress gateway 165 such as previously described.

In the example shown in FIG. 1B, the enterprise routing engine 135 may be configured to provide certain tagged communications 150 to the signing server while providing other tagged communications 150 directly to the core routing engine 155. For example, the enterprise routing engine 135 may provide tagged communications 150 that are to be attested at Level A to the signing server 160 while providing all other tagged communications 150 directly to the core routing engine 155.

Figure 1C:
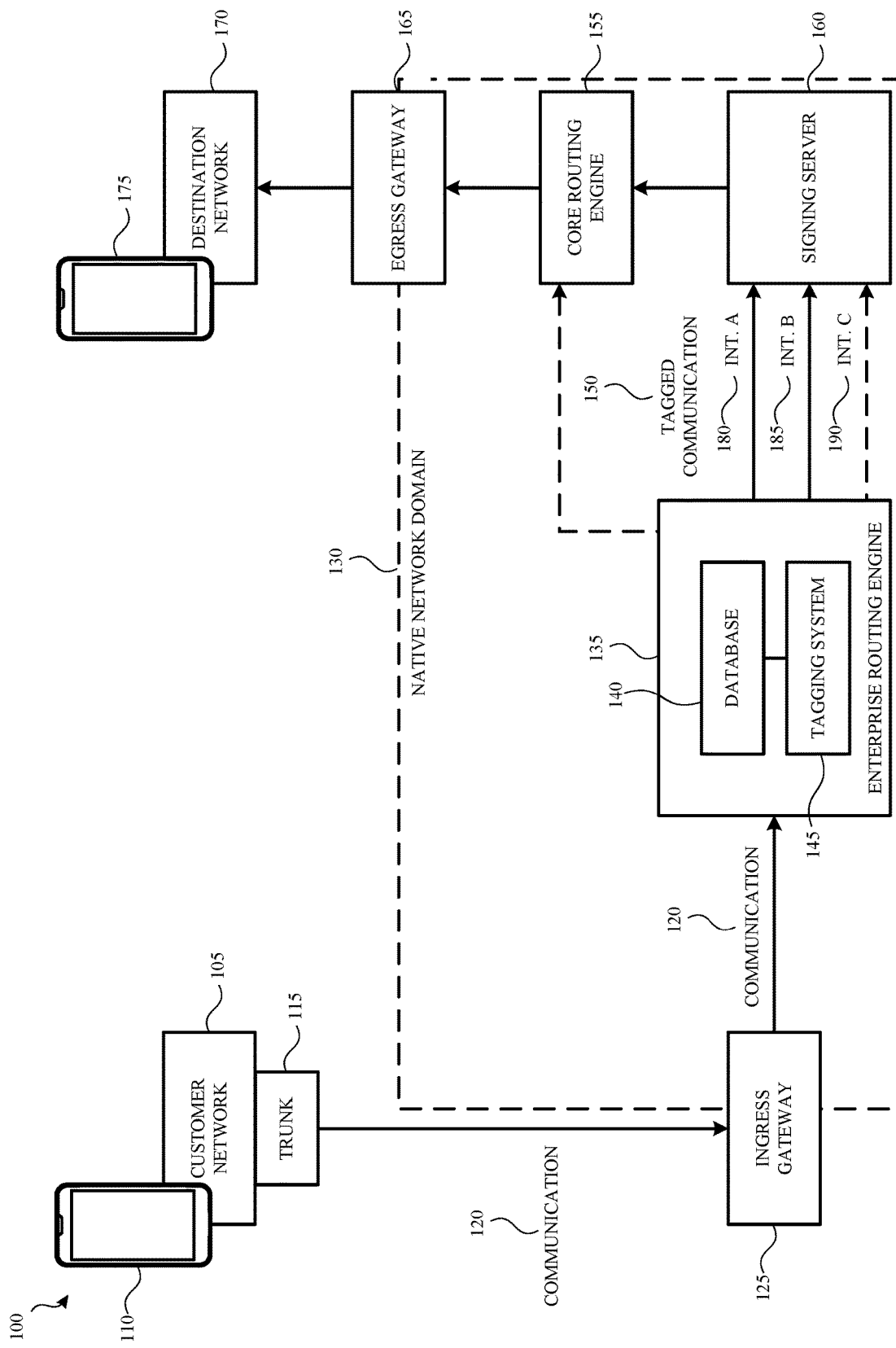
FIG. 1C illustrates an example system for providing an attestation level to a communication in accordance with a third example.

FIG. 1C illustrates the example system 100 of FIG. 1A in accordance with a third example. In the example shown in FIG. 1C, the enterprise routing engine 135 is configured to send the tagged communication 150 directly to the signing server 160 over various ports or interfaces. In this example, each interface of the signing server 160 may be associated with a particular attestation level. For example, interface A 180 of the signing server 160 may be configured to accept or receive tagged communications 150 that are to be given Level A attestation, interface B 185 of the signing server 160 may be configured to accept or receive tagged communications 150 that are to be given Level B attestation, and interface C 190 of the signing server 160 may be configured to accept or receive tagged communications 150 that are to be given Level C attestation.

Once the signing server 160 has attested the tagged communication 150 with the appropriate attestation level (e.g., based on the tag), the signing server 160 may provide the tagged communication 150 and the encrypted certificate to the core routing engine 155. The tagged communication 150 and its associated encrypted certificate is then provided to the egress gateway 165 such as previously described.

In some examples, the enterprise routing engine 135 may be configured to provide certain tagged communications 150 to the signing server 160 on the various interfaces while providing other tagged communications directly to the core routing engine 155. For example, the enterprise routing engine 135 may provide tagged communications 150 that are to be attested at Level A to the signing server 160 on interface A 180 and provide tagged communications 150 that are to be attested at Level B to the signing server 160 on interface B 185 while providing all other tagged communications 150 directly to the core routing engine 155.

Figure 2:
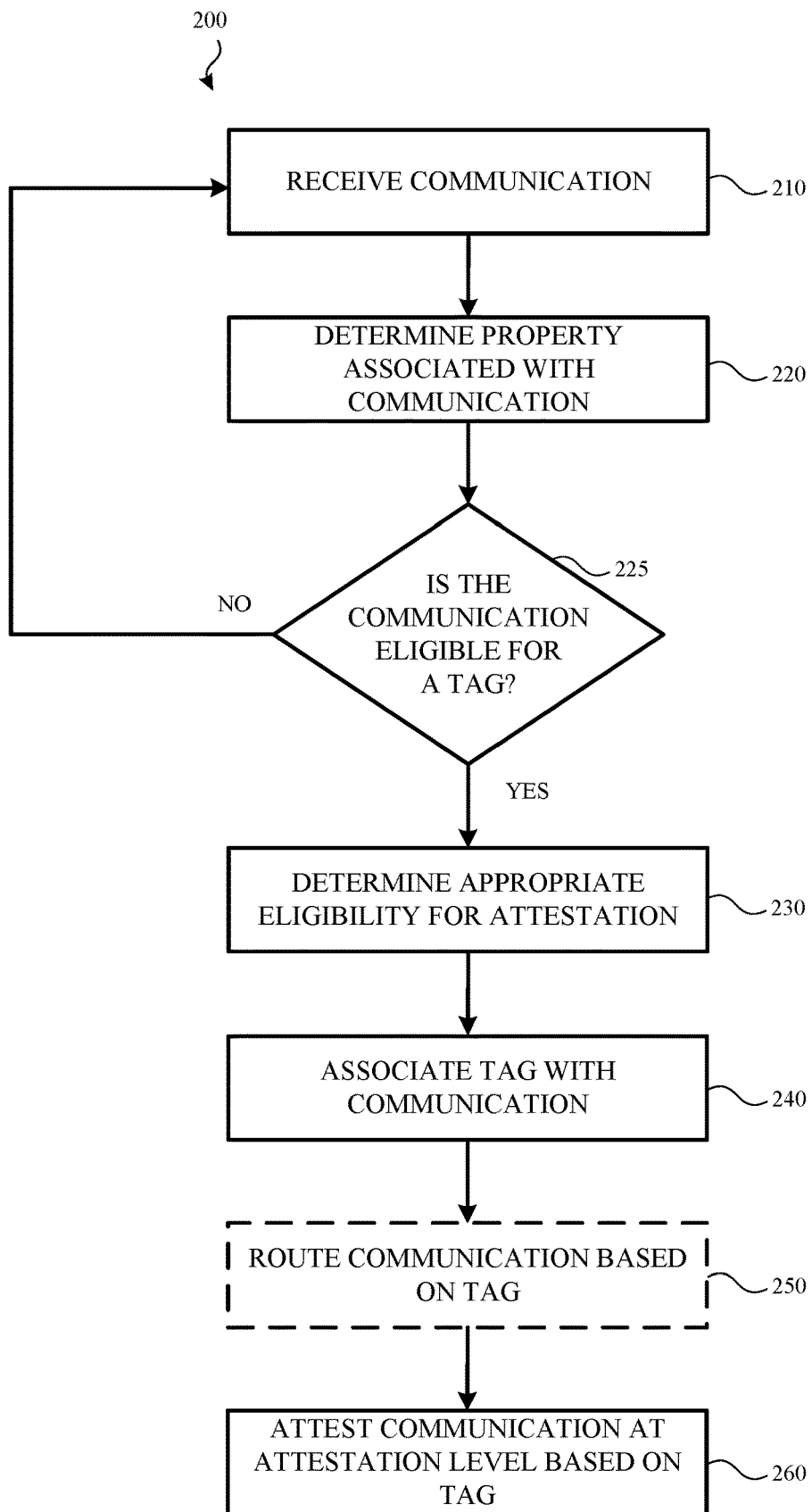
FIG. 2 illustrates a method for providing an attestation level to a communication according to one or more examples.

FIG. 2 illustrates a method 200 for providing an attestation level to a communication according to one or more examples. In some examples, the method 200 may be implemented by the system 100 shown and described with respect to FIG. 1A-FIG. 1C.

Method 200 begins when a communication is received (210) by a native network domain. In some examples, the communication is received by an ingress gateway of the native network domain such as previously described. The communication may be a telephone call in a VOIP system, a telephone call in a cellular system, a telephone call in a PSTN system, etc.

Once the communication is received, a property of the communication is determined (220). In examples, the property of the communication may comprise multiple parameters. For example, the property may be one or more of a domain associated with an enterprise from which the call originated, an originating telephone number associated with the communication, and so on. In some examples, the property is used to determine an attestation level for which the communication is eligible. For example, the native network domain may have instructions to attest all communications originating from a particular enterprise at a particular attestation level.

In some examples, the native network domain may include a first routing engine that is configured to determine a tag to apply to the communication. The tag indicates the attestation level for the received communication. For example, when the property of the received communication is determined, the first routing engine may compare the property with stored information to determine (225) whether the communication is eligible to be tagged. For example, the determination whether the communication is eligible to be tagged may be based on whether the enterprise from which it was received has subscribed to the tagging and attestation service provided by the native network domain (such as native network domain 130). If the communication is not eligible to be tagged, the method 200 returns to operation 210, where it waits to receive an additional communication. If the communication is eligible to be tagged, the method 200 determines (230) an appropriate tag for the received communication. That is, the comparison of the property of the received communication to the stored information may be used to determine whether the received communication is eligible for Level A attestation, Level B attestation or Level C attestation such as previously described.

Based on the results of the comparison, the first routing engine appends or otherwise associates (240) a tag to the received communication to generate a tagged communication. Once the received communication has been tagged, the tagged communication may be routed (250) to a number of different systems.

In one example, the tagged communication is routed (250) to a second routing engine, such as, for example, a core routing engine such as previously described. The second routing engine may determine, based on the tag, whether to route the tagged communication to a signing system (e.g., a signing server) or whether to route the tagged communication to an egress gateway of the native network domain.

For example, if the tag indicates the tagged communication is eligible for Level A attestation, the second routing engine may provide the tagged communication to the signing system. The signing system subsequently attests (260) the tagged communication at a particular attestation level by providing an encrypted certificate to the tagged communication that indicates the communication is attested at Level A (or other level for which it is eligible). The signing system may either provide the tagged communication and the encrypted certificate back to a routing engine or may provide the tagged communication and the encrypted certificate to the egress gateway of the native network domain.

In a second example, the first routing engine may be configured to route (240) the tagged communication based on the tag. For example, the first routing engine may route the tagged communication to the signing system or to the second routing engine based on information contained in the tag. For example, if the tag indicates that the tagged communication is eligible for Level A attestation, the first routing engine may route the tagged communication to the signing system. The signing system attests (260) the communication at attestation Level A and provides the tagged communication and the encrypted certificate to the second routing engine.

However, if the tag indicates that the tagged communication is not eligible for Level A attestation, the first routing engine may route (250) the tagged communication to the second routing engine thereby foregoing the signing system. The second routing engine may then provide the tagged communication to the egress gateway of the native network domain.

In yet another example, the first routing engine may route (250) the tagged communication to a particular interface of the signing server and/or route the tagged communication to the second routing engine based on the information contained in the tag. For example, the first routing engine may provide tagged communications that are to be attested at Level A to the signing system on a first interface and provide tagged communications that are to be attested at Level B to the signing system on a second interface. All other tagged communications may be routed directly to the second routing engine such as previously described.

Figure 3:
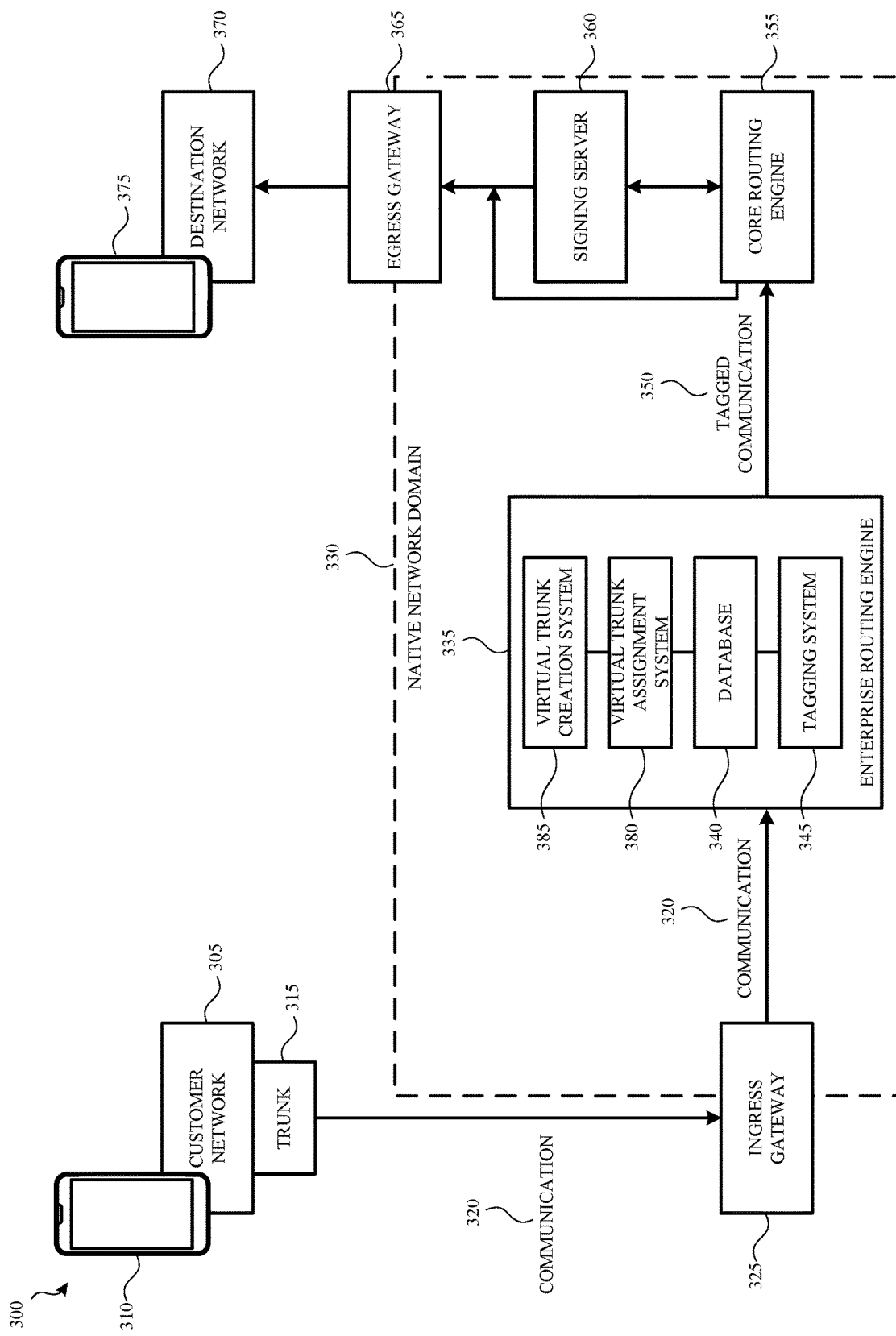
FIG. 3 illustrates an example system for providing an attestation level to a communication in accordance with a fourth example.

FIG. 3 illustrates an example system 300 for providing an attestation level to a communication (e.g., communication 320) in accordance with a fourth example. In this example, the attestation level of the communication 320 is based on a domain associated with the communication 320 in combination with a trunk (e.g., a virtual trunk assigned by an enterprise routing engine) associated with the communication 320.

System 300 may include similar systems to those shown and described with respect to FIG. 1A-FIG. 1C. For example, the system 300 may include a calling device 310 associated with a customer network 305. The customer network 105 may be associated with a particular domain.

As briefly described above, a domain may include information about the nature and/or origin of the communication 320 and/or the calling device 310. For example, a domain (e.g., the native network domain 330) may be associated with or otherwise assigned to particular subscribers. In another example, the domain may contain information corresponding to the country of origin of the communication 320. As described in the examples above, the domain information may be used to determine an attestation level for the communication 320.

When the communication 320 is received by the native network domain 330, the communication 320 is routed from an origin to a destination via an ingress gateway 325 and an egress gateway 365 respectively. The communication 320 may subsequently be provided to a destination network 370 and/or a destination device 375 associated with the destination network 370 similar to what was described with respect to FIG. 1A-FIG. 1C.

The ingress gateway 325 is associated with or otherwise assigned a trunk 315. The trunk 315 is associated with a trunk identifier. The trunk identifier may be associated with the communication 320. In some examples, such as those previously described, the trunk identifier may be used to determine the attestation level for the communication 320. However, in the example shown in FIG. 3, the system 300 may create and/or assign a virtual trunk to the communication 320 and the virtual trunk may be used to determine that attestation level for the communication 320. In this example, domain information, along with the virtual trunk information may be used to determine the attestation level of the communication 320.

For example, when the communication 320 is received by the ingress gateway 325, the ingress gateway 325 may provide the communication 320 to an enterprise routing engine 335. The enterprise routing engine 335 may include a virtual trunk creation system 385 and a virtual trunk assignment system 380. The virtual trunk creation system 385 may be used to create one or more virtual trunks (or virtual trunk groups) that can be assigned or otherwise associated with the communication 320. Once the virtual trunks are created, the virtual trunk assignment system 380 assigns the communication 320 to a particular virtual trunk. Although FIG. 3 shows the virtual trunk creation system 385 being integrated with the enterprise routing engine 335, the virtual trunks may be created by a separate/remote system.

In an example, the virtual trunk creation system 385 creates three different virtual trunks and each virtual trunk is associated with a particular attestation level. For example, if the virtual trunk assignment system 380 assigns/associates the communication 320 with a first virtual trunk, the communication 320 may subsequently be attested at a first attestation level. Likewise, if the virtual trunk assignment system 380 assigns/associates the communication 320 with a second virtual trunk, the communication 320 may subsequently be attested at a second attestation level and so on. Although three virtual trunks are specifically mentioned, the virtual trunk creation system 385 may create any number of virtual trunks.

As discussed above, when the communication 320 originates from the customer network 305, the communication 320 is associated with a trunk identifier. However, the virtual trunk assignment system 380 enables the trunk identifier of the communication 320 to be changed. Thus, if the communication 320 was originally going to be attested at a first attestation level (e.g., based on the trunk identifier provided by the trunk 315) assignment of a new trunk identifier by the virtual trunk assignment system 380 enables the communication 320 to be attested at a second, different attestation level.

Likewise and explained above, a domain associated with the communication 320 may be used to determine an attestation level of the communication 320. However, the virtual trunk assignment system 380 may assign a virtual trunk to these communications (or a subset of these communications) to ensure these communications are attested at the appropriate attestation levels.

For example, and as explained above, the domain associated with the communication 320 may indicate the customer at which the communication 320 originated. From the customer information, the enterprise routing engine 335 may identify the market (e.g., using information in database 340) associated with the customer. The enterprise routing engine 345 may determine that communications 320 from this market/customer be attested at a particular attestation level. In some examples, the particular attestation level may be different from the attestation level originally associated with the domain. Accordingly, the virtual trunk assignment system 380 may assign a particular virtual trunk to those communications 320 in order to cause the system to attest the communications at a different level.

In another example, multiple domains may be associated with the same trunk 315. However, communications from each of the different domains may need to be attested at different attestation levels. Without the ability to assign virtual trunks to these communications, the enterprise routing engine 335 would only be able to attest these communications at the same attestation level.

However, using the virtual trunk creation system 385 and/or the virtual trunk assignment system 380, the enterprise routing engine 335 can assign virtual trunks to different communications. For example, the enterprise routing engine 335 may determine that a communication 320 associated with a first domain should be attested at a first level. As such, the communication 320 should be associated with a first virtual trunk. Likewise, the enterprise routing engine 335 may determine that a communication 320 associated with a second domain should be attested at second, different attestation level-even if the communication 320 associated with second domain and the communication 320 associated with the first domain are associated with the same trunk 315. In such an example, the virtual trunk assignment system 380 may assign the communication associated with the first domain a first virtual trunk. Likewise, the virtual trunk assignment system 380 may assign the communication 320 associated with the second domain a second virtual trunk. In some examples, information stored in the database 340 may indicate the attestation level for the communications from the different domains.

In some examples, a trunk group identifier associated with a virtual trunk, such as the first virtual trunk and/or the second virtual trunk, may take the place of, or otherwise be used as, an identifier associated with the first domain and/or the second domain respectively when assigning an attestation level to the communication 320. For example, a particular domain (e.g., the first domain) may be used to determine or otherwise specify media files that should be played on a media server. In this example, a communication 320 that is tagged or otherwise associated with the identifier of the first domain may not be routed correctly by the core routing engine 355 (described below) because the domain (or its associated identifier) is ambiguous regarding a particular attestation level. As such, a trunk group identifier associated with the first virtual trunk may be used in place of the domain identifier. Thus, an attestation level of the communication 320 may be based on the trunk group identifier instead of on an identifier associated with the domain.

In yet another example, a combination of the domain and the virtual trunk may be used to determine an attestation level of a communication 320. For example, a communication 320 may be associated with a first domain and a first virtual trunk. The domain identifier associated with the first domain may specify a first attestation level while the trunk group identifier associated with the first virtual trunk may specify a second, different attestation level. In such an example, the attestation level specified by the virtual trunk may supersede the attestation level specified by the domain or vice versa.

In another example, the communication 320 may be associated with a domain and virtual trunk. However, the domain identifier associated with the communication 320 may be ambiguous regarding the desired attestation level for the communication 320. In such an example, an attestation level specified by the trunk group and/or the virtual trunk may be used to determine the appropriate attestation level.

Once a virtual trunk is assigned to a communication 320, the tagging system 345 appends a tag to the communication 320. The tag indicates a level of attestation for which the communication 320 is eligible such as previously described.

The tagged communication 350 is provided to a core routing engine 355 and the core routing engine 355 determines, based at least in part on the tag, how to route the tagged communication 350 such as previously described with respect to FIG. 1A. In an example, the tagged communication 350 may be routed to a signing sever 360 and/or a core routing engine 355 in a manner similar to the tagged communication 150 described above with respect to FIG. 1B and FIG. 1C.

The tagged communication 350 is subsequently provided to the egress gateway 365. The egress gateway 365 provides the tagged communication 350 to a destination network 370 and the destination device 375.

Figure 4:
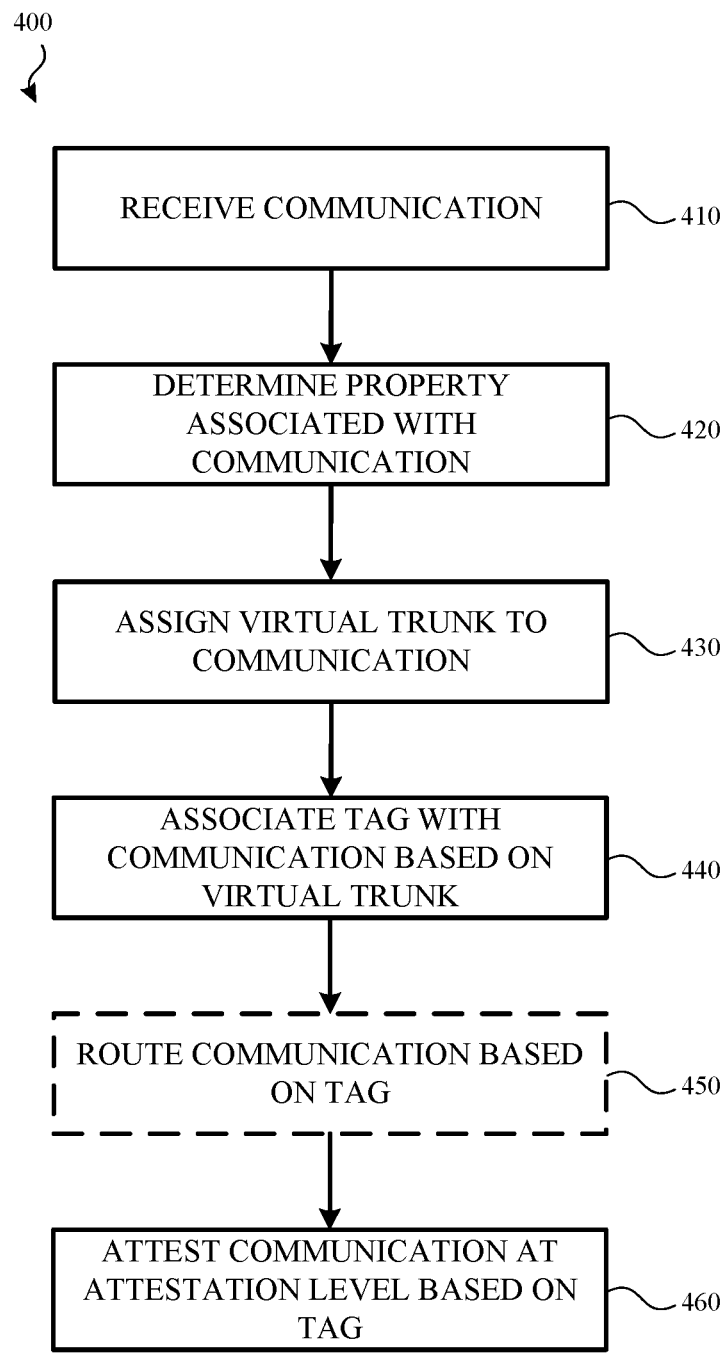
FIG. 4 illustrates a method for providing an attestation level to a communication using a virtual trunk and a domain according to one or more examples.

FIG. 4 illustrates a method 400 for providing an attestation level to a communication using a virtual trunk and a domain according to one or more examples. In some examples, the method 400 may be implemented by the system 300 shown and described with respect to FIG. 3.

Method 400 begins when a communication is received (410) by a native network domain. In some examples, the communication is received by an ingress gateway of the native network domain such as previously described.

Once the communication is received, a property of the communication is determined (420). For example, the property may be a domain associated with an enterprise from which the communication originated. In another example, the property may be a trunk identifier associated with the communication. Although specific properties are mentioned, other properties may be used.

Method 400 then assigns (430) a virtual trunk to the communication based, at least in part, on the property. For example, if the communication is associated with a domain and a determination is made that communications originating from the domain are to be attested at a particular attestation level, a particular virtual trunk will be assigned (e.g., using a virtual trunk assignment system) to that communication. The virtual trunk may be associated with an attestation level.

Once the virtual trunk is assigned to the communication, a tag is associated (440) with the communication to generate a tagged communication. The tagged communication is routed (450) to a number of different systems such as, for example, a signing system and/or a core routing engine such as previously described.

When the communication is received by the signing system, the signing system attests (460) the tagged communication at a particular attestation level by providing an encrypted certificate to the tagged communication that indicates the communication is attested at the appropriate level of attestation based on information associated with the virtual trunk.

Figure 5:
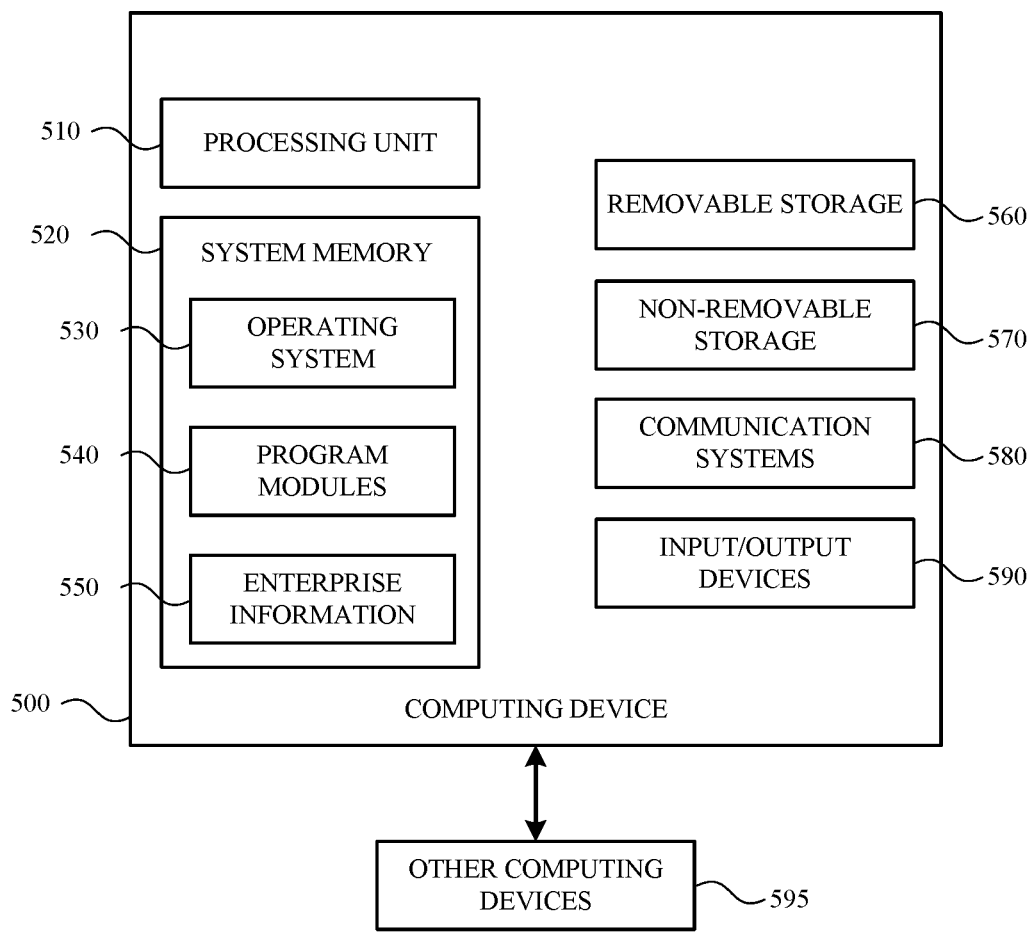
FIG. 5 is a block diagram of a computing device according to one or more examples.

FIG. 5 is a system diagram of a computing device 500 according to an example. The computing device 500, or various components and systems of the computing device 500, may be integrated or associated with an enterprise routing engine, a core routing engine, a signing server, a customer network, an ingress gateway, an egress gateway, a tagging system, or a destination network. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering or determining enterprise information 550 such as domain information, telephone numbers, attestation level requests and so on. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, routing engines, gateways, signings systems and the like. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   a destination network;
   a signing server;
   a core routing engine; and
   an enterprise routing engine
   receiving a telephone communication addressed to the destination network,
   determining based at least in part on a property associated with the telephone communication, whether the telephone communication is associated with a particular originating domain,
   determining, based on determining that the telephone communication is associated with the particular originating domain, an attestation level for which the telephone communication is eligible, the attestation level including at least one of: full attestation, partial attestation, and gateway attestation,
   associating a tag with the telephone communication, wherein the tag indicates the attestation level, and
   providing the telephone communication and the tag to the core routing engine, wherein
   the core routing engine determines, based at least in part on the tag, to route the telephone communication to the signing server, provides an attestation at the attestation level, and routes the telephone communication with the attestation to the destination network.

2. The system of claim 1, wherein the attestation is provided by the signing server.

3. The system of claim 1, wherein the core routing engine determines, based at least in part on the tag, whether to provide the attestation at the determined attestation level.

4. The system of claim 2, wherein the attestation and the communication are routed to an egress server by the signing server.

5. The system of claim 2, wherein the attestation and the communication are routed by the signing server to the routing engine, and the routing engine routes the communication with the attestation to the destination network.

6. The system of claim 1, wherein determining the attestation level comprises comparing the particular originating domain to a list of domains that have subscribed for an attestation service.

7. The system of claim 1, wherein the routing engine routes the communication to a particular interface of a plurality of interfaces of the signing server based on the attestation level.

* * * * *